United States Patent Office 3,827,910
Patented Aug. 6, 1974

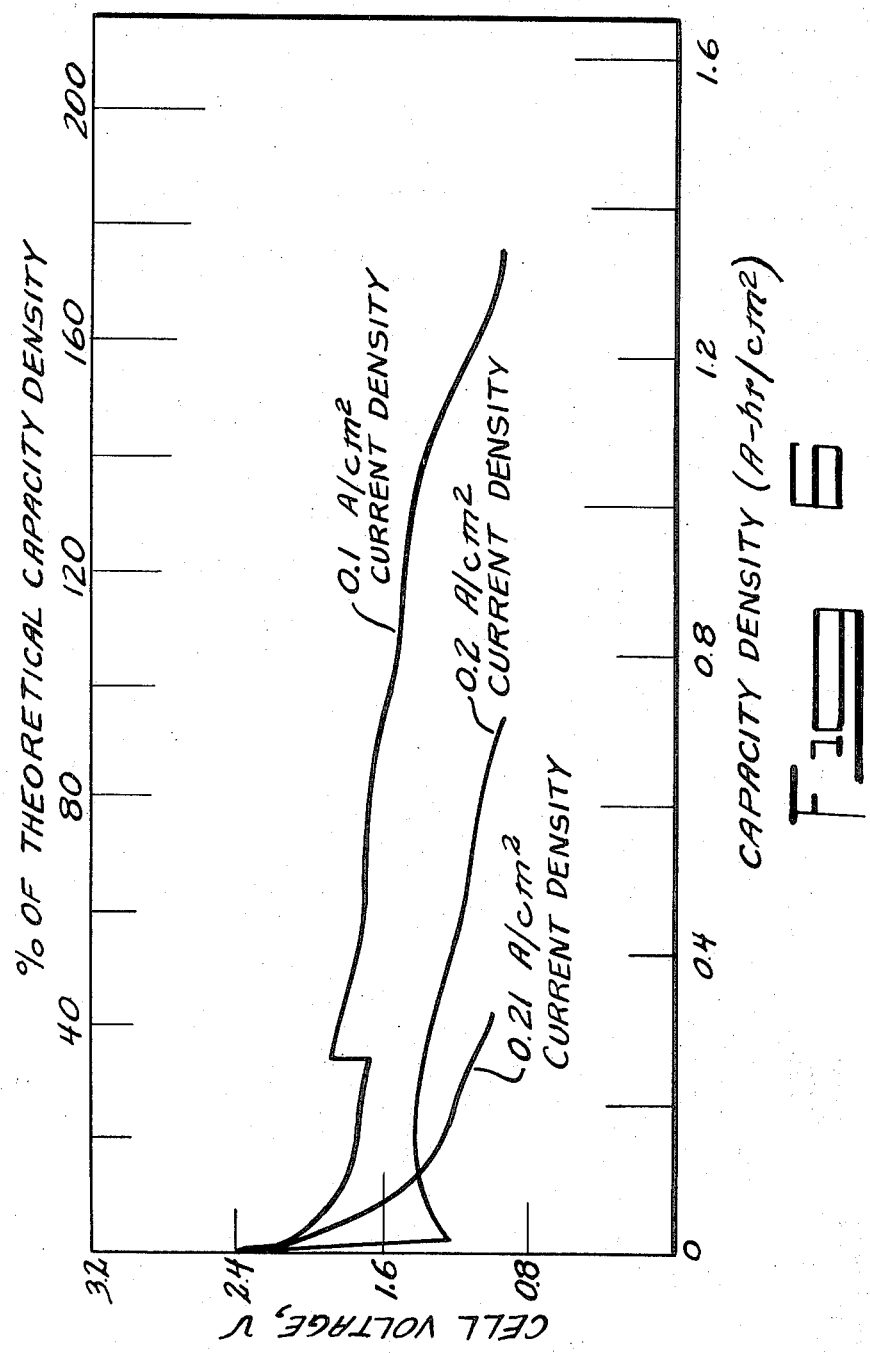

3,827,910
HOMOGENEOUS CATHODE MIXTURES FOR SECONDARY ELECTROCHEMICAL POWER-PRODUCING CELLS
Elton J. Cairns, Lisle, Hiroshi Shimotake, Hinsdale, and Jan R. Selman, Wheaton, Ill., assignors to The United States of America as represented by the United States Atomic Energy Commission
Filed Nov. 30, 1972, Ser. No. 311,048
Int. Cl. H01m 35/02
U.S. Cl. 136—6 LF                           15 Claims

ABSTRACT OF THE DISCLOSURE

This invention consists of a secondary, electrochemical power-producing cell having an anode containing a molten alkali metal of low electronegativity, an electrolyte containing alkali-metal ions, and a novel cathode containing a reactant comprising a chalcogen wherein the cathode comprises a substantially homogeneous mixture of the reactant, a porous substrate material impregnable by the reactant, electrolyte, and an electronically-conducting material.

CONTRACTUAL ORIGIN OF THE INVENTION

The invention described herein was made in the course of, or under, a contract with the United States Atomic Energy Commission.

BACKGROUND OF THE INVENTION

This invention relates to electrochemical power-producing cells and more particularly to alkali-metal/chalcogen secondary cells having high specific energies, high capacity densities and long lifetimes. Specifically, the invention relates to a novel cathode composition for secondary electrochemical cells whereby cell capacity densities and chalcogen-electrolyte interfacial reaction areas are significantly increased.

In our technologically-oriented society, there is an increasing need for compact, convenient, pollution-free electrical power sources and energy-storage devices. A large number of power-source needs, both civilian and military, have gone unfulfilled because of the limited capabilities of presently available batteries and engine-generators. In our attempt to satisfy these needs, a great deal of effort has been expended over the last decade in areas of energy conversion and energy storage. A large portion of the effort has involved electrochemical devices such as fuel cells, metal/air cells, secondary (electrically rechargeable) cells with both aqueous and nonaqueous electrolytes, and thermally regenerative cells.

One particular class of cells which has shown considerable promise for development into electrochemical cells useful in applications such as auxiliary power sources for military hybrid vehicles, battery power sources for electrically powered commercial vehicles and implantable batteries serving as power sources for artificial hearts, consists of secondary cells that operate at elevated temperatures. These cells employ molten alkali-metal anodes such as lithium or sodium (of low electronegativity, low equivalent weight, and high exchange-current density), molten-salt or cation-conducting solid electrolytes, and cathode materials of Groups VIA and VIIA of the periodic chart, the chalcogens and halogens. Of this class of cells, the alkali-metal/chalcogen cell having a molten-salt or paste electrolyte containing alkali-metal ions has shown significant progress in its development toward fulfilling the above-stated applications. Examples of such cells can be found in U.S. Pats. No. 3,488,221 and No. 3,531,324, both assigned to the assignee of the present invention.

A large number of factors and variables affect the performance of such alkali-metal (sodium or lithium)/chalcogen cells. One very important factor is the particular composition and structure of the cathode. A substantial amount of work has been performed with such secondary cells utilizing various different cathode structures, as in U.S. patent application Ser. No. 178,577 (70), U.S. Pat. 3,716,409, as well as various different chalcogen mixtures incorporating a variety of additives, as in U.S. patent application Ser. No. 228,619, now abandoned, both applications being assigned to the assignee of the present application. Such cathode structural and compositional changes have significantly increased the performance of the secondary cells, enabling them to achieve high specific powers and specific energies. However, there still remains a considerable problem of insufficient chalcogen-electrolyte interfacial reaction area as well as good, long-term chalcogen utilization.

Heretofore, the cathode chalcogen reactants, such as sulfur, selenium or mixtures thereof, have usually been impregnated in a rigid porous substrate structure such as disclosed in U.S. Pat. 3,716,409. The function of the porous substrate structure was to contain the chalcogen reactant within the cathode as well as provide reaction sites for the reactant and the electrolyte by providing a continuous phase for alkali-metal ion transport to the chalcogen-electrolyte interface. One problem with such structures was that they experienced severe fragmentation and disintegration at the current and capacity densities required for the above applications. The inventors, however, in an attempt to overcome the above-described remaining problems without impairing the performance of the cells have devised a new and novel cathode composition wherein the cathode reactant, the porous substrate material, electrolyte and electronically-conducting material are intimately mixed together in varying proportions to form a substantially homogeneous nonrigid cathode mixture. Such cathode mixtures, when utilized in secondary electrochemical cells, significantly increase the chalcogen-electrolyte interfacial reaction area by increasing the surface area of the porous substrate material. In addition, electrochemical reactions not involving the cathode reactant occur within these mixtures which add significantly to the capacity density of the electrochemical cells.

Therefore, it is an object of the present invention to provide novel cathode compositions for utilization in alkali-metal/chalcogen electrochemical cells.

It is another object of the present invention to provide mixed cathode compositions with increased porous substrate surface areas for use in alkali-metal/chalcogen secondary electrochemical cells.

It is finally an object of this invention to provide alkali-metal/chalcogen secondary electrochemical cells having substantially homogeneously mixed cathodes which are capable of achieving high capacity densities.

Further objects and advantages of the invention will be apparent from the following detailed description.

SUMMARY OF THE INVENTION

According to the present invention, a cathode containing a substantially homogeneous mixture of chalcogen-containing reactant, porous substrate material, electrolyte and electronically-conducting material is employed in an alkali-metal/chalcogen secondary electrochemical cell having an anode containing a molten alkali metal of low electronegativity and an electrolyte containing alkali-metal ions. The constituents of this cathode mixture are initially in a solid granular form of about 200 $\mu$m. or less grain size and homogeneously mixed together in varying proportions. This cathode composition may be utilized in its initially prepared form, or it may be compressed to form a disk or a plurality of pellets. The mixture resides in a cathode housing within the secondary cell, the housing having a shape appropriate for the particular physical form of the mixture utilized. These mixed cathode compositions considerably increase the porous substrate material surface area available as reaction sites for the reactant and electrolyte. In addition, these compositions enable the cells to achieve high capacity densities due to synergistic electrochemical reactions involving the electrolyte, the porous substrate material and the electronically-conducting material.

BRIEF DESCRIPTION OF THE DRAWINGS

FIG. 6 is a graph showing the voltage vs. capacity density and percent theoretical capacity density for another cell utilizing the present invention.

DETAILED DESCRIPTION OF THE INVENTION

Figure 1:
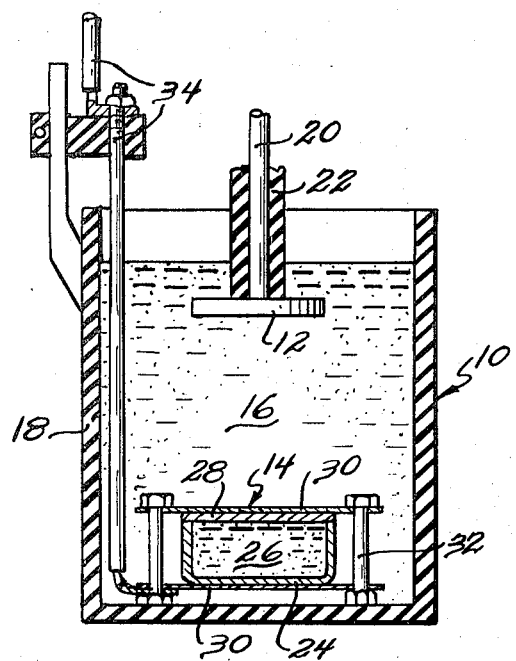
FIG. 1 is a schematic view of a cell used experimentally to prove the operability of the present invention.

Referring first to FIG. 1, secondary cell 10 includes an anode 12 and a cathode 14 separated by molten-salt electrolyte 16 and disposed within alumina or niobium crucible 18. Attached to anode 12 is an electrical niobium lead 20 surrounded by beryllia sleeve 22. Cathode cup 24 contains substantially homogeneous cathode mixture 26, the present invention, which is retained within cup 24 by sheath 28. Sheath 28 is mounted on cup 24 and held securely in place by niobium brackets 30 and niobium bolts 32. Tantalum lead 34 is electrically connected to cathode cup 24.

Figure 2:
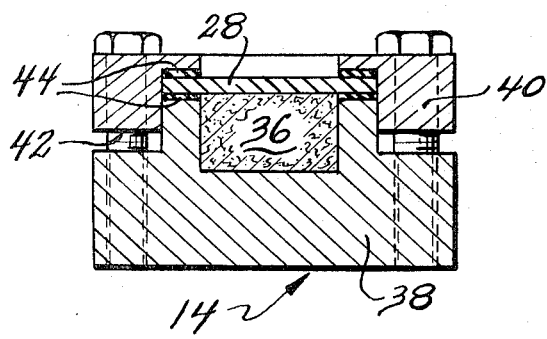
FIG. 2 is a schematic cross-sectional view of a cathode utilizing the present invention in the form of a compressed disk.

Cathode 14 may vary considerably in structure depending upon the physical form of cathode mixture 26. FIG. 2 illustrates one particular configuration for cathode 14 which may be utilized when the homogeneous cathode mixture 36 is in the form of a compressed disk. The disk is located in a recessed portion of molybdenum housing 38 and is retained within housing 38 by sheath 28 which is secured by molybdenum clamp 40 and molybdenum bolts 42. Grafoil gaskets 44 separate the horizontal surfaces of sheath 28 from housing 38 and clamp 40.

Figure 3:
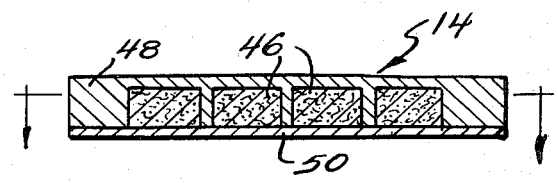
FIG. 3 is a schematic cross-sectional view of a cathode utilizing the present invention in the form of compressed pellets.
Figure 4:
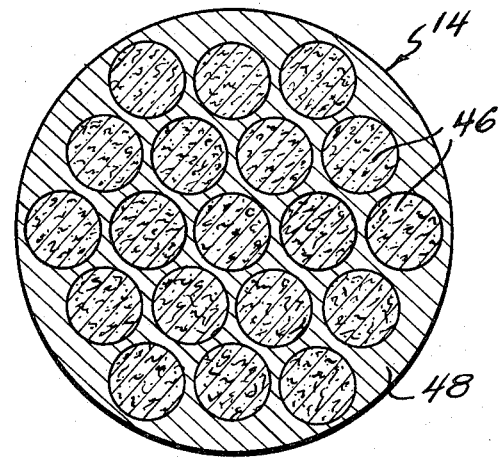
FIG. 4 is a schematic horizontal-sectional view of the cathode of FIG. 3.

FIG. 3 and FIG. 4 illustrate still another cathode configuration. In these figures, however, the cathode mixture 46 is in the form of a plurality of compressed, cylindrical pellets. A plurality of pellets 46 are imbedded and immobilized within porous substrate sheath 48. Molybdenum or grafoil disk 50 is securely mounted on one surface of sheath 48 so as to cover pellets 46 and securely maintain them within sheath 48.

In practice, any cell design may be utilized with the present invention, cell 10 merely representing an example of the type of cell utilized experimentally to test and prove the operability of the invention. Structural materials for any of the cell components, except the cathode mixture, can be selected from any number of a wide variety of conventional materials known in the art. There are also a large number of electrolytes containing alkali-metal ions in both molten and ceramic paste disk form known to the art and from which electrolyte 16 can be selected. While lithium was utilized in the present experimental work as the anode reactant material, sodium can also be used with the present invention due to sodium's low electronegativity, low equivalent weight and known operability with sulfur or selenium in a secondary electrochemical cell.

In addition, cell 10 generally remained unsealed for experimental convenience in examining the cell after testing. Those experimental cells which were unsealed were tested in gloveboxes containing a high-purity ($<2$ p.p.m. each of $O_2$ and $N_2$; $<1$ p.p.m. $H_2O$) helium atmosphere, thereby simulating a sealed condition. Therefore, the present invention is applicable to sealed as well as unsealed alkali-metal/chalcogen secondary cells.

To determine the operability of the present invention, a series of cells were tested in which various cathode mixture constituents in various proportions wer utilized. For all these tests, unless stated otherwise in the specification, anode 12 of FIG. 1 comprised porous nickel, having a porosity of 80% and an average pore size of 60 $\mu$m., soaked or impregnated with lithium. This anode structure, however, was merely for testing purposes, the present invention not being limited thereto. The porous nickel matrix referred to is composed of a random array of nickel fibers compressed in a random fashion and sintered at high temperatures, thereby creating a porous metal.

The cathode mixtures were prepared using two different methods, although the method of preparation is not critical to nor limiting upon the invention. In one method, the cathode reactant, for example sulfur, was melted and then impregnated in the porous substrate material. After impregnation, the impregnated substrate material was cooled and then ground to a grain size of about 200 $\mu$m. or less to produce an intimate mixture of reactant and substrate material. The electronically-conducting material, for example molybdenum foam, was similarly impregnated or wetted by the electrolyte, cooled, and then ground to about 200 $\mu$m. or less grain size. This mixture was then added to and homogeneously mixed with the reactant-substrate mixture. The second method used to produce the substantially homogeneous cathode mixture was to separately grind each of the solid constituents to about 200 $\mu$m. or less grain size and then thoroughly mix them together. It should be noted that while a 200 $\mu$m. grain size was utilized in the present experimental work, the invention is not limited thereto. What is important is that the materials be ground to as fine a grain size as practical so as to obtain as large a surface area as possible. With either described method, however, a substantially homogeneous cathode mixture was produced.

While this cathode mixture was solid in form when produced and placed in an electrochemical cell, upon heating the cell to operational temperature, the reactant and electrolyte melted. This, then, resulted in a slightly fluid cathode mixture having a liquid homogeneous mixture of reactant and electrolyte with particles of porous substrate material and electronically-conducting material homogeneously dispersed and suspended throughout the liquid phase of the mixture. This occurred whether the mixture was loosely packed in the cathode cup, as in FIG. 1, or whether, as shown in FIGS. 2 to 4, the mixture was compressed prior to placing it in the cell.

Utilizing cell configurations similar to that of FIG. 1 and cathode configurations similar to those shown in FIGS. 1 to 4, a series of lithium/chalcogen cells were operated mixing various types and percentages of components together to form the mixed cathodes. Due to the great number of cells tested, the results for only a representative number of the tested cells are presented and discussed herein, Tables I to IV summarizing considerable information regarding each of these cells. Table I summarizes the cathode mixture constituents for each of the cells, while Table II indicates the percentage by volume of each constituent of each cell's cathode mixture. Table III shows some of the physical characteristics of each cell, and Table IV summarizes the performance of each cell.

While Table I summarizes the cathode mixture constituents of the cells discussed herein, the present invention is not to be limited to these specific materials. Any number of known chalcogen-containing reactants may be utilized as the reactant material in the present invention, the reactants disclosed in the previously mentioned U.S. patent application Ser. No. 228,619 being one example. Also, as with the choice of electrolyte for use in cell 10, any of a large number of electrolytes containing alkali-metal ions known to the art may be utilized in the substantially homogeneous cathode mixture. It is preferred, however, that the material be impregnable rather than merely wettable by the electrolyte in order to obtain maximum retention of the electrolyte.

TABLE I.—CATHODE MIXTURE CONSTITUENTS

| Cell number | Reactant | Electrolyte (eutectic) | Porous substrate material (percent porosity, pore size in $\mu m$) | Electronically-conducting material (percent porosity, pore size in $\mu m$) |
| --- | --- | --- | --- | --- |
| L-3 | S | LiF-LiCl-KCl | Graphite (91;13-40) | Mo foam (78;20). |
| L-5 | S | LiF-LiCl-KCl | do | Do. |
| L-7 | 92 a/o S-5.7; a/o Se-2.3; a/o Tl. | LiF-LiCl-KCl | Graphite (63;1.4) | Do. |
| L-8 | S | LiF-LiCl-KCl | do | Do. |
| L-9 | S | LiF-LiCl-KCl | Graphite (63;1.4) and graphite (48;120). | Do. |
| 86 | | LiF-LiCl-KCl | Graphite (48;120) | Mo foam (78;25). |
| 87 | | LiCl-KCl | do | Do. |
| 88 | | LiF-LiCl-LiBr-LiI-KI-CsI. | do | Do. |
| 89 | | LiF-LiCl-KCl | | Do. |
| S-18 | $P_4S_{10}$ | LiF-LiCl-KCl | Graphite (63;1.4) and graphite (48;120). | Do. |
| S-19 | 80 a/o S-14; a/o Se-6; a/o Tl. | LiF-LiCl-KCl | do | Do. | homogeneous cathode mixture. Further, porous graphite is disclosed as the porous substrate material utilized in the discussed cathode mixtures. However, any of a large number of porous materials, the term porous being defined for these purposes as meaning having a large surface area, may be used in the present invention as long as the material is relatively corrosion resistant to the reactant material and electrolyte, is a good electrical conductor, and is impregnable or wettable by the chalcogen-containing reactant. Porous graphite, porous carbon and carbon black are examples of such materials. Finally, the electronically-conducting material utilized in the tested cells was molybdenum foam. However, other materials such as niobium and chromium as well as porous non-metallic conductors like porous carbon and porous graphite may also be utilized. These materials need only be electronically-conducting, resistant to the electrolyte and the reactant, and either wettable or impregnable by the electrolyte so as to encourage retention of the electrolyte within the homogeneous mixture.

TABLE II.—VOLUME PERCENTAGES OF CATHODE MIXTURE CONSTITUENTS

| Cell number | Reactant | Electrolyte | Porous substrate material | Electronically-conducting material |
| --- | --- | --- | --- | --- |
| L-3 | 52 | 5 | 41 | 2 |
| L-5 | 31 | 56 | 8 | 5 |
| L-7 | 30 | 36 | 32 | 2 |
| L-8 | 23 | 53 | 23 | 1 |
| L-9 | 28 | 25 | 45 | 2 |
| 86 | 0 | 65 | 29 | 6 |
| 87 | 0 | 65 | 29 | 6 |
| 88 | 0 | 65 | 29 | 6 |
| 89 | 0 | 58 | 0 | 42 |
| S-18 | 24 | 10 | 62 | 4 |
| S-19 | 20 | 11 | 65 | 4 |

TABLE III.—PHYSICAL CHARACTERISTICS OF TESTED CELLS

| Cell number | Anode | | | | Cathode | | | | Cathode sheath | | | | Inter-electrode distance (cm.) |
| --- | --- | --- | --- | --- | --- | --- | --- | --- | --- | --- | --- | --- | --- |
| | Area (cm.²) | Li (g.) | Thickness (cm.) | Electrolyte (eutectic) | Area (cm.²) | Reactant wt. (g.) | Cath. cup mat'l | mat'l | mat'l | Porosity (percent) | Pore size ($\mu m$) | Thickness (cm.) | |
| L-3 | 4.9 | 0.66 | 0.4 | LiF-LiCl-KCl | 4.28 | 1.12 | Nb | Mo | 78 | 20 | 0.2 | | 1 |
| L-5 | 4.9 | 0.52 | 0.4 | LiF-LiCl-KCl | 4.28 | 0.49 | Nb | Mo | 78 | 20 | 0.58 | | 1 |
| L-7 | 4.9 | 0.48 | 0.4 | LiF-LiCl-KCl | 3.62 | 1.07 | Nb | Mo | 78 | 20 | 0.13 | | 1 |
| L-8 | 4.9 | 0.31 | 0.4 | LiF-LiCl-KCl | 3.73 | 0.60 | Nb | Mo | 78 | 25 | 0.61 | | 1 |
| L-9 | 4.9 | 0.27 | 0.4 | LiF-LiCl-KCl | 3.63 | 0.46 | C | C | 77 | 20 | 0.4 | | 1 |
| 86 | 2 | 0.7 | 0.6 | LiF-LiCl-KCl | 1.32 | 0 | Mo | Mo | 78 | 25 | 0.31 | | 1 |
| 87 | 2 | 0.7 | 0.6 | LiCl-KCl | 1.32 | 0 | Mo | Mo | 78 | 25 | 0.31 | | 1 |
| 88 | 2 | 0.6 | 0.6 | LiF-LiCl-LiBr-LiI-KI-CsI | 1.32 | 0 | Mo | Mo | 78 | 25 | 0.32 | | 1 |
| 89 | 2 | 0.7 | 0.6 | LiF-LiCl-KCl | 1.3 | 0 | Mo | Mo | 78 | 25 | 0.30 | | 1 |
| S-18 | 20.3 | 5.6 | 1.2 | LiF-LiCl-KCl | 20.3 | 11.4 | | Graphite | 48 | 33 | 0.32 | | 1.3 |
| S-19 | 20.3 | 5.4 | 1.2 | LiF-LiCl-KCl | 20.3 | 11.4 | | Graphite | 48 | 33 | 0.32 | | 1.3 |

TABLE IV.—PERFORMANCE OF TESTED CELLS

| Cell number | Theo. cap. dens., a.-hr./cm.² | Charge | | | | Discharge | | | | Cap./unit vol. of Cath. dens. a.-hr./cm.³ | Cell life | | Temp. (° C.) |
| --- | --- | --- | --- | --- | --- | --- | --- | --- | --- | --- | --- | --- | --- |
| | | Curr. dens., a./cm.² | Cap. dens., a.-hr./cm.² | Cutoff voltage | | Curr. dens., a./cm.² | Cap. dens., a.-hr./cm.² | Cutoff voltage | Percent theo. cap. dens. | | Cycle life number of cycles | Lifetime (hrs.) | |
| L-3 | 0.44 | 0.32 | 0.22 | 2.54 | | 0.32 | 0.13 | 1.0 | 41 | | 7 | | 410 |
| L-5 | 0.23 | 0.26 | 0.19 | 2.50 | | 0.27 | 0.11 | 1.0 | 46 | | 22 | | 405 |
| L-7 | 0.40 | 0.25 | 1.16 | 2.65 | | 0.30 | 0.93 | 1.0 | 230 | 0.97 | 350 | 2,017 | 400 |
| L-8 | 0.27 | 0.11 | 0.64 | 2.50 | | 0.08 | 0.21 | 1.0 | 78 | 0.16 | 82 | | 400 |
| L-9 | 0.23 | 0.21 | 1.27 | 2.64 | | 0.24 | 0.85 | 1.0 | 175 | 0.88 | 166 | 809 | 400 |
| 86 | 0 | 0.10 | 1.02 | 3.0 | | 0.13 | 0.98 | 1.0 | | 1.20 | >455 | >2,810 | 380 |
| 87 | 0 | 0.10 | 0.32 | 3.0 | | 0.13 | 0.29 | 1.0 | | 0.31 | 147 | 483 | 380 |
| 88 | 0 | 0.10 | 0.25 | 3.0 | | 0.13 | 0.15 | 1.0 | | 0.16 | 265 | 123 | 380 |
| 89 | 0 | 0.10 | 0.19 | 3.0 | | 0.13 | 0.18 | 1.0 | | 0.29 | 130 | 580 | 380 |
| S-18 | 0.76 | 0.17 | 1.4 | 3.1 | | 0.30 | 1.3 | 1.0 | 175 | 0.51 | >111 | >1,137 | 392-420 |
| S-19 | 0.58 | 0.21 | 0.38 | 2.9-3.2 | | 0.21 | 1.1 | 1.0 | 187 | 0.42 | 200 | 700 | 400-420 |

The first cell of the group discussed herein utilizing a substantially homogeneous cathode mixture was cell L-3, the components and proportions thereof being shown in Tables I and II. The cathode structure utilized was similar to that shown in FIG. 1, the cathode mixture merely being loosely packed in the cathode cup. Although the cell only operated for 7 cycles and achieved a capacity density of only 0.13 a.-hr./cm.$^2$, this was due to a short-circuit resulting from lithium bridging between cathode and anode and not due to the cathode mixture. Cell L-3, however, did indicate that a homogeneously mixed cathode which lacked structural strength and rigidity was capable of operation in a secondary electrochemical cell. It should be noted that due to the mixture's lack of rigidity and structural strength, some type of cathode sheath was utilized in this and all the other cells in order to contain the cathode mixture within the cathode. Such a sheath was also advantageous due to the fact that the homogeneous mixtures, whether loosely packed or compressed, of many of the cells had a tendency to expand due to absorption of electrolyte from the cell, and the sheath contained this expansion.

Another cell, L-5, had a cathode structure similar to that of L-3. However, the cathode mixture composition was considerably different. The proportion of electrolyte and electronically-conducting material was much greater than in L-3, while the amount of sulfur and substrate material was lower. Although the cell performance in terms of actual capacity density achieved was about the same as that of L-3, this capacity density in terms of percent of theoretical maximum capacity density based on 100% sulfur utilization increased to 46%. Since sulfur losses through vaporization occurred during the operation of this cell, the actual percentage of the theoretical capacity density achieved by this cell was very likely higher. The reason for this was thought to be the increased electrolyte to sulfur ratio which enabled more complete utilization of the sulfur within the cathode mixture.

Having determined that such homogeneous cathode mixtures are operable in secondary electromechanical cells, tests were continued to determine the optimum compositions for such cathode mixtures. Cell L-7 contained approximately equal amounts of reactant, electrolyte and porous substrate material with a small amount of porous metal as the electronically-conducting material. In addition, the reactant utilized was a 92 atomic percent (a/o) S-5.7 a/o Se-2.3 a/o Tl alloy in lieu of the pure sulfur used in cells L-3 and L-5. Further, the graphite utilized as the substrate material had a much smaller pore size (see Table I). This smaller pore size, along with hand-pressing the cathode mixture into the cathode cup, reduced the void volume within the cathode mixture to about 40% by volume. As can be seen from Table IV, this cell achieved an exceptionally high capacity density as well as a high cycle life and lifetime and was terminated only because of severe corrosion to the cathode current lead. In fact, cell L-7 achieved a maximum capacity density of 375% of the theoretical maximum capacity density after 69 cycles and approximately 25% of its lifetime, the representative or normal value being about 230% theoretical. In other words, cell L-7 achieved a capacity density significantly greater than the maximum capacity density which was theoretically possible based on 100% utilization of the cathode reactant. It was thought, therefore, that there must have been some unknown electrochemical reactions occurring within the cell which contributed to the cell's capacity density.

It was observed that an "incubation period" of about the first 120 hours of operation was required before cell L-7 reached a steady-state discharge performance. During this period, the discharge capacity density continually increased until a steady-state was achieved. It is believed that this "incubation period" is a result of a homogeneous process occurring within the cathode by interdiffusion of cathode mixture constituents and penetration of the cathode mixture by electrolyte from outside the cathode, thereby filling the void spaces therein. Once the steady-state was achieved, loss of cathode reactant through vaporization was minimal.

Due to the results obtained from cell L-7, cell L-8 was designed and constructed in a similar manner. However, there were some significant differences between the two cells' cathode mixtures. Sulfur was utilized as the reactant in cell L-8, and the electrolyte to reactant ratio was about double that of cell L-7. Also, the cathode mixture in this cell was compressed under vacuum at 2500 kg. to form a right circular cylinder to fit the cathode cup. This was in lieu of hand-pressing the mixture into the cathode cup as was done with cell L-7. The density of the compressed mixture was about 1.98 g./cm.$^3$, and there was an estimated void volume of about 5%.

The performance of cell L-8 was good, but not nearly as good as that of L-7. Also, while the capacity density was high at 78% theoretical, it did not go above the maximum theoretical capacity density as did L-7 even though the cathode mixture was compressed. It is thought that this performance along with the severe short-circuiting after 82 cycles was due to the exceptionally high electrolyte to reactant ratio as well as the fact that the compressed cathode mixture cylinder was too small for the cathode cup. This lack of a tight fit in the cathode cup resulted in a total cathode void volume of about 22%, even though the mixture itself only had a 5% void volume.

Cell L-9 was designed similar to L-8, but the cathode cup containing the cathode mixture was made from porous carbon instead of molybdenum foam. This reduced the weight of the cathode cup, and the smaller pores of the carbon allowed the cell's electrolyte to penetrate yet not completely fill the cup's pores. Also, the amount of electrolyte in the cathode mixture was considerably reduced and the amount of porous substrate material considerably increased from that of cell L-8. Another important change in L-9 was that two types of graphite were used as the porous substrate material in the cathode mixture. Because of this, the cathode mixture was produced in a somewhat different manner than the previously outlined methods. Sulfur was impregnated in the small-pore graphite, electrolyte was impregnated in the large-pore graphite, and electrolyte was also impregnated in the molybdenum foam. The three impregnated materials were then thoroughly ground to about a 200 $\mu$m. grain size and then homogeneously mixed together in a proportion of 0.356:0.489:0.155, respectively, to form the cathode mixture outlined in Table II. This mixture was then compressed under 10,000 lbs. force under vacuum to form a disk having a density of about 1.82 g./cm.$^3$. This disk was again somewhat too small for the cathode cup, as in cell L-8, and this resulted in a total cathode void volume of about 25%.

Figure 5:
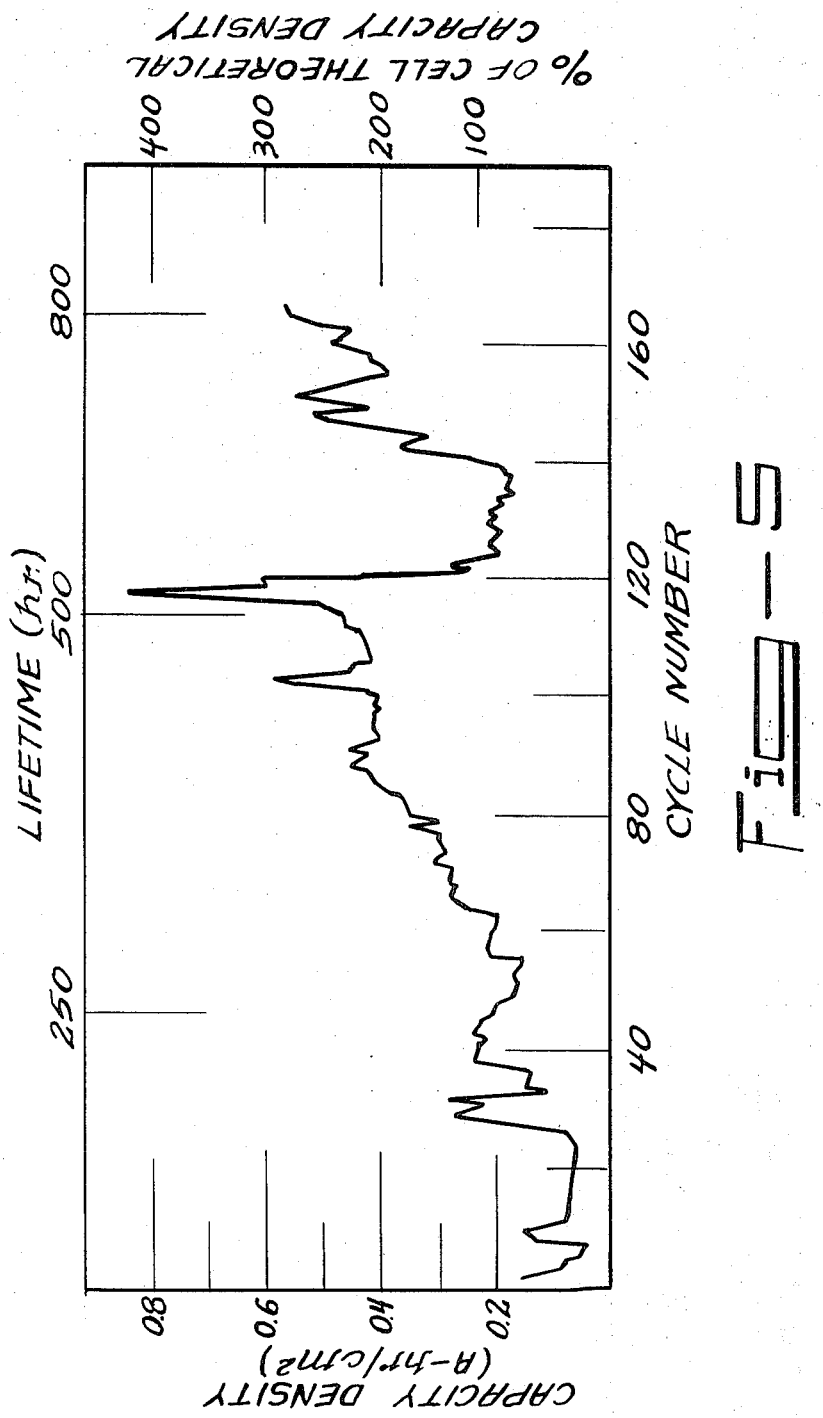
FIG. 5 is a graph showing the capacity density and percent theoretical capacity density vs. cycle life and lifetime for a cell utilizing the present invention.

The results obtained from cell L-9 were also exceptional and are shown in FIG. 5. Not only was the representative capacity density of 0.35 a.-hr./cm.$^2$ at a current density of 0.24 a./cm.$^2$ quite good, but this was 175% of the theoretical maximum capacity density for the cell. After 94 cycles and 60% of the cell's lifetime, a maximum capacity density of 371% theoretical was achieved. It is felt that this was due not only to the increased amount of substrate material which resulted in an increased substrate surface area, thereby providing a greater number of reaction sites, but also that the constituents of the cathode mixture other than the cathode reactant were involved in some kind of their own electrochemical reactions which added to the capacity density of the cells. It is also felt that the compressing of the cathode mixture may be important in achieving a continuous network of current collection (via the substrate material and electronically-conducting material) within the cathode mixture, and therefore it is preferred that the cathode mixture be compressed prior to utilization in an electrochemical cell.

To test this idea that additional reactions other than that involving the cathode reactant may be occurring within the cathode mixture so as to cause the cells to exceed the theoretical maximum capacity density based only on 100% utilization of the chalcogen-containing reactant, three cells, 86, 87 and 88, were tested. These cells were similar in design to cell L–9, except that the cathode mixture was compressed under 10,000 lbs. force under a vacuum to form a plurality of pellets which were contained in a cathode structure similar to that shown in FIGS. 3 and 4. As can be seen from Table I, however, there were two major differences between the cathode mixtures of these cells and that of L–9. One difference was that the cathode mixtures of cells 86, 87 and 88 each contained a different electrolyte. The most important difference, however, was that none of these three cells contained a chalcogen reactant.

The performances of cells 86, 87 and 88 were striking. All three cells achieved significant capacity densities without having any chalcogen reactant present in their cathode mixtures. The exceptionally high capacity density and long cell life of cell 86 clearly indicates that the constituents, other than the chalcogen-containing reactant, of a homogeneously mixed cathode are significantly involved in reactions of their own which contribute to the cell's total capacity density, which was quite unexpected since the original purpose of using porous substrate material and electronically-conducting material in the cathode mixture was to increase the electronic conductivity and current collection capability of the mixture. It is thought that some possible reactions occurring within the cathode mixture might include reactions between the porous substrate material and the electrolyte as well as the porous electronically-conducting metal and the electrolyte.

Cell 89, similar in design and structure to cells 86, 87 and 88, contained only electrolyte and porous electronically-conducting metal in its cathode mixture. Neither cathode reactant nor porous substrate material were present. The cell was constructed and tested in order to further identify the unknown reactions which were occurring in the cathode mixtures. As is evident from Table IV, the molybdenum foam without the porous substrate material is capable of producing some capacity density. However, when the two are both present in a cathode mixture, as in cell 86, the capacity density produced therefrom is significantly large.

The performance of these cells as well as others indicate that the additional reactions occurring within these cells containing substantially homogeneous cathode mixtures involve reactions between electronically-conducting metal, such as molybdenum niobium or chromium, and the chlorine ions in the electrolyte, forming chlorides such as $MoCl_5$, as well as reactions between electrolyte ions and the porous substrate material. Apparently, these electrochemical reactions occur when the electrochemical cells are being charged, and upon discharge of the cells, these reactions are reversed so as to release the energy stored in the reaction products by forming the original cell constituents, thereby contributing to the cells' capacity densities. It has been determined that the porous metal-electrolyte reactions are of more significance in contributing capacity density than the substrate material-electrolyte reactions. However, it is important to note that there is an apparent synergism occurring between all the cathode mixture constituents. The capacity density achievable by the constituents' electrochemical reactions individually cannot account for the extremely high capacity density achieved by the total homogeneous cathode mixture. The combination present in the substantially homogeneous cathode mixture results in a capacity density which is greater than the sum of the capacity densities of the several constituents taken separately. These individual electrochemical reactions which do not involve the chalcogen reactant as well as the synergistic effect of the combination of the electrochemical reactions are either not present in the prior art cathodes which utilize rigid substrate structures, or else they are so small that they have not been detected and are therefore of little significance in the performance of such cells.

A number of larger scale cells were tested which utilized the homogeneous cathode mixture in the form of a plurality of pellets, the cathode structure being similar to that of FIGS. 3 and 4. For these scaled-up cells, the cathode mixture was compressed in a vacuum at about 9900 lbs. force to form cylindrical pellets of about 1.3 cm. in diameter and 1 cm. in length. Cells S–18 and S–19 are representative of these cells. Cell S–18 utilized $P_4S_{10}$ as the cathode reactant and 2 pore sizes of graphite as the substrate material, as in cell L–9. The performance of this cell was exceptionally good, as can be seen from several of the discharge shown in FIG. 6. An exceptionally high capacity density of 1.3 a.-hr./cm.$^2$ at a current density of 0.3 a./cm.$^2$ was achieved, and this was 175% of the theoretical maximum capacity density. Since $P_4S_{10}$ containment within the cathode mixture was poor, a considerable amount of the capacity density had to be provided by synergistic electrochemical reactions among the other three mixture constituents as previously discussed. Cell S–19 was similar to S–18 in design and structure. The cathode reactant for S–19, however, was 80 a/o S–14 a/o Se–6 a/o Tl instead of $P_4S_{10}$. The performance of this cell was even better than that of S–18, the capacity density of 1.1 a.-hr./cm.$^2$ being 187% of the theoretical maximum capacity density. This indicates once again that synergistic reactions occurring between the electrolyte ions and substrate material and between electrolyte ions and porous metal are the result of the present invention and contribute significantly to the capacity density of the electrochemical cells.

It should be noted that while the porous metal-electrolyte electrochemical reaction contributes considerable capacity density to the electrochemical cells when it occurs in combination with the other cell reactions, utilizing porous metals such as molybdenum foam, which have relatively high densities, as the electronically-conducting material in the cathode mixture increases the weight of the cell. It is felt that perhaps the added capacity density achieved per unit of porous metal in the cathode mixture may not be worth the significant increase in weight of the cell resulting from the presence of the metal, since a porous substrate conductor such as porous carbon can meet the previously discussed requirements of the mixture's electronically-conducting material constituent. In addition, the porous substrate conductor itself would take part in electrochemical reactions with the electrolyte similar to those reactions between the electrolyte and the porous substrate material. Therefore, by utilizing an appropriate electronically-conducting porous substrate material as the electronically-conducting material in the cathode mixture in lieu of porous metal, electrochemical reactions would still take place which would contribute, although considerably less than with porous metal, to the cell's capacity density, yet the weight of the cell would be significantly reduced. Also, the surface area of the total porous substrate material within the cathode mixture would additionally be increased if a porous substrate conductor is used as the electronically-conducting material, providing thereby even more chalcogen-electrolyte interfacial reaction sites which would result in a further increase in the cell's capacity density.

As is clearly evident from the above, the cathode mixtures according to the present invention have performed exceptionally well. While the volume percentages of the various constituents varied considerably in the cathode mixtures tested, a substantially homogeneous cathode mixture of 20 to 30 volume percent reactant, 32 to 65 volume percent porous substrate material, 10 to 36 volume percent electrolyte, and 2 to 4 volume percent electronically-conducting material is preferred. The large surface area of the porous substrate material in the substantially homogeneous cathode mixtures of the present invention significantly increased the chalcogen-electrolyte interfacial reaction areas by providing considerably more reaction sites than possible with a solid substrate structure, for the surface-to-volume ratio of active particles within these homogeneous cathode mixtures is about an order of magnitude larger than in cathodes having solid substrate structures. In addition, the long-term chalcogen utilization was exceptional, and the present mixtures resulted in unexpected synergistic electrochemical reactions within the cathode mixture that added significantly to the capacity density of the electrochemical cells. Finally, the nonrigid, structureless cathode mixture allows the cathode structure to be constructed in just about any desired size or shape, yet it retains its conductivity. This is an advantage which is lacking in previous cathode structures which sometimes required precision machining of the various cathode substrate structures.

It will be understood that the invention is not to be limited to the details given herein but that it may be modified within the scope of the appended claims.

The embodiments of the invention in which an exclusive property or privilege is claimed are defined as follows:

1. In a secondary electrochemical power-producing cell comprising an anode containing a molten alkali-metal of low electronegativity, an electrolyte containing alkali-metal ions, and a cathode containing a reactant comprising a chalcogen, said electrolyte and reactant being molten at operating temperatures, the improvement wherein in operation said cathode comprises a substantially homogeneous mixture including a suspension of fine particles of porous substrate material and electronically-conducting material homogeneously dispersed in a molten mixture of the reactant and electrolyte.

2. The improvement according to claim 1 wherein said reactant is selected from the group consisting of sulfur, sulfur-selenium alloy, sulfur-selenium-thallium alloy, and $P_4S_{10}$.

3. The improvement according to claim 1 wherein said porous substrate material is selected from the group consisting of porous graphite and porous carbon.

4. The improvement according to claim 1 wherein said electronically-conducting material is selected from the group consisting of molybdenum, niobium, chromium, porous carbon and porous graphite.

5. The improvement according to claim 1 wherein there is provided a sheath having a recess and closure defining a disk-shaped chamber for containing said substantially homogeneous mixture in the form of a compressed disk.

6. The improvement according to claim 1 wherein there is provided a porous sheath having a plurality of recesses with closure defining a plurality of cylindrically shaped chambers for containing said substantially homogeneous mixture.

7. In a secondary electrochemical power-producing cell at operating temperature comprising an anode containing lithium, a molten electrolyte containing lithium ions, and a cathode containing a molten reactant comprising a chalcogen, the improvement wherein said cathode comprises a substantially homogeneous mixture of molten reactant, molten electrolyte, particulate and porous substrate material impregnable by said reactant, and particulate, electronically-conducting material other than said substrate material, said substrate and electronically-conducting materials being homogeneously dispersed and suspended as fine particles within the homogeneous mixture of molten reactant and electrolyte.

8. The improvement according to claim 7 wherein said reactant is selected from the group consisting of sulfur, sulfur-selenium alloy, sulfur-selenium-thallium alloy, and $P_4S_{10}$.

9. The improvement according to claim 7 wherein said porous substrate material is selected from the group consisting of porous graphite and porous carbon.

10. The improvement according to claim 7 wherein said electronically-conducting material is selected from the group consisting of molybdenum, niobium, chromium, porous carbon and porous graphite.

11. The improvement according to claim 7 wherein said substantially homogeneous mixture is in the form of a compressed disk.

12. The improvement according to claim 7 wherein said substantially homogeneous mixture is in the form of a plurality of small, cylindrically-shaped, compressed pellets, said pellets imbedded in a porous substrate sheath.

13. In a secondary electrochemical power-producing cell comprising an anode containing lithium, an electrolyte containing lithium ions, and a cathode containing a reactant comprising sulfur, the improvement wherein said cathode comprises a substantially homogeneous mixture of 20 to 30 volume percent of a molten reactant selected from the group consisting of sulfur, sulfur-selenium alloy, sulfur-selenium-thallium alloy and $P_4S_{10}$; 32 to 65 volume percent of porous substrate particles composed of a material selected from the group consisting of porous graphite and porous carbon; 10 to 36 volume percent of a molten electrolyte; and 2 to 4 volume percent of electronically-conducting particles composed of a material selected from the group consisting of molybdenum, niobium, chromium, porous carbon and porous graphite, said substrate and electronically-conducting particles being of less than about 200 $\mu$m. grain size and said reactant and electrolyte being a homogeneous liquid mixture at the cell operating temperature with a uniform dispersion of said substrate and electronically-conducting particles suspended therein.

14. The improvement according to claim 13 wherein said substantially homogeneous mixture is in the form of a compressed disk.

15. The improvement according to claim 13 wherein said substantially homogeneous mixture is in the form of a plurality of small, cylindrically-shaped, compressed pellets, said pellets imbedded in a porous substrate sheath.

References Cited

UNITED STATES PATENTS

| | | | |
|---|---|---|---|
| 3,716,409 | 2/1973 | Cairns et al. | 136—6 R |
| 3,567,516 | 3/1971 | Rightmire et al. | 136—6 LF |
| 3,443,997 | 5/1969 | Argue et al. | 136—83 R |
| 3,666,560 | 5/1972 | Cairns et al. | 136—6 LF |
| 3,531,324 | 9/1970 | Fischer et al. | 136—6 LF |
| 3,488,221 | 1/1970 | Shimotoke et al. | 136—6 LF |
| 3,730,771 | 5/1973 | Tannenberger et al. | 136—6 R |

WINSTON A. DOUGLAS, Primary Examiner

C. F. LE FEVOUR, Assistant Examiner

U.S. Cl. X.R.

136—20